(12) United States Patent
Kanayama et al.

(10) Patent No.: US 6,921,205 B2
(45) Date of Patent: Jul. 26, 2005

(54) SLIDING MATERIAL

(75) Inventors: Hiroshi Kanayama, Aichi (JP); Mitsuaki Hakamata, Aichi (JP); Yoshio Kumada, Aichi (JP)

(73) Assignee: Taiho Kogyo Co., Ltd., Aichi (JP)

( * ) Notice: Subject to any disclaimer, the term of this patent is extended or adjusted under 35 U.S.C. 154(b) by 79 days.

(21) Appl. No.: 10/276,241

(22) PCT Filed: Mar. 13, 2002

(86) PCT No.: PCT/JP02/02361
§ 371 (c)(1),
(2), (4) Date: Nov. 14, 2002

(87) PCT Pub. No.: WO02/075172
PCT Pub. Date: Sep. 26, 2002

(65) Prior Publication Data
US 2003/0111511 A1 Jun. 19, 2003

(30) Foreign Application Priority Data
Mar. 16, 2001 (JP) ........................... 2001-076230

(51) Int. Cl.⁷ ............................................. F16C 29/02
(52) U.S. Cl. ............................. 384/13; 384/42; 384/907
(58) Field of Search ......................... 384/12, 13, 26, 384/42, 625, 907, 908; 92/71

(56) References Cited
U.S. PATENT DOCUMENTS 4,509,803 A * 4/1985 Takenaka et al. ............ 384/13
4,641,570 A * 2/1987 Futamura et al. ............ 92/71
4,683,804 A * 8/1987 Futamura et al. ............ 92/71
5,056,417 A * 10/1991 Kato et al. .................... 92/71
5,875,702 A * 3/1999 Kawagoe et al. ........... 92/12.2
6,123,009 A * 9/2000 Kanayama et al. ........... 92/71

FOREIGN PATENT DOCUMENTS

| EP | 0 709 587 A1 | 5/1996 | |
|---|---|---|---|
| EP | 0 926 340 A2 | 6/1999 | |
| FR | 2234815 A * | 2/1975 | ........... F16C/33/00 |
| JP | 60217329 * | 10/1985 | |
| JP | 7-4435 | 1/1995 | |
| JP | 7-233816 | 9/1995 | |
| JP | 7-259863 | 10/1995 | |

OTHER PUBLICATIONS

International Search Report.

* cited by examiner

Primary Examiner—Thomas R. Hannon
(74) Attorney, Agent, or Firm—Sughrue Mion, PLLC

(57) ABSTRACT

A slide member which is excellent in the initial running-in property and can provide an excellent sliding property even under a strict sliding condition and, in particular, a slide member with a solid lubrication coating film which is excellent not only in the friction property but also in the wear resistance under the fluid lubrication, boundary lubrication and dry lubrication conditions. The slide member includes a solid lubrication coating film on a flat-plate-shaped base member, characterized in that, in the surface of the slide member, there are formed a plurality of concentrical grooves extending in the peripheral direction of the slide member surface, and, between the mutually adjoining ones of the grooves, there are formed ridge portions respectively.

26 Claims, 2 Drawing Sheets

SLIDING MATERIAL

TECHNICAL FIELD

The present invention relates to a flat-plate-shaped slide member such as a swash plate for a compressor, in particular, to a circular-flat-plate-shaped slide member and, in more particular, to a slide member with a solid lubrication coating film which is enhanced not only in the initial running-in property but also in the friction characteristic under the fluid lubrication condition.

BACKGROUND ART

Conventionally, in various slide members, there is widely known a technique which applies a solid lubrication coating film onto the sliding surface of the slide member to thereby enhance the boundary lubrication property and dry property thereof.

Especially, in a swash cam type compressor which includes a swash plate obliquely fixed to a rotary shaft or a swash plate obliquely fixed to a rotary shaft in such a manner that the inclination angle thereof can be changed, as the rotary shaft is rotated, the swash cam increases or decreases the volume of a partitioned space existing in the interior of the compressor to thereby expand or compress a cooling medium. The above swash plate slides with respect to a seal member referred to as a shoe and seals airtight between them, whereby the cooling medium can be expanded and compressed in a given space. The peculiarity of the sliding motion of swash plate is that, since the swash plate and shoe slide with respect to each other before lubricating oil reaches the sliding surface in the initial stage of the operation of the compressor, the swash plate is slided under the dry sliding condition where the lubricating oil is not present. Also, a refrigerant in the form of gas reaches the sliding surface before new lubricating oil reaches there and cleans the lubricating oil remaining on the sliding surface. As a result of this, seizure is very easy to occur in the sliding surface.

In order to adapt the swash plate to the above-mentioned strict sliding conditions, in the case of a swash plate for a compressor as well, normally, a solid lubrication coating film is applied to the sliding surface of the swash plate before it is actually used.

In the case of the dry lubrication condition that is the severest condition of the operating conditions of a swash plate type compressor, use of solid lubricant can surely enhance the seizure resistance of the sliding surface to a certain degree; but, a film, which is obtained by joining two kinds of solid lubricant together with thermosetting resin, is unfavorably easy to wear. On the other hand, the sliding surface must also have a good sliding property for high speeds and high temperatures under the fluid lubrication condition, so that it must have a good initial running-in property.

Under the above-mentioned severe sliding condition, in case where the film application strength of the solid lubrication coating film is increased so as to enhance the wear resistance of the sliding surface, the running-in property of the sliding surface is degraded to thereby increase the sliding resistance thereof, causing the applied film to peel off, which lowers the seizure resistance of the sliding surface. On the other hand, in case where, in order to attach great importance to the running-in property, the quantity of the solid lubricant is increased or material easy to wear is used to thereby lower the strength of the film, the wear resistance and dry property of the sliding surface are degraded as well as the film is easy to wear or easy to peel off, thereby increasing the occurrence of seizure in the sliding surface; that is, the increased quantity of the solid lubricant or use of the material easy to wear puts another limit on the sliding surface in terms of seizure resistance.

In view of the above-mentioned circumstances of the prior art, it is an object of the invention to provide a slide member which is improved in the initial running-in property and also can provide an excellent sliding property even under the strict sliding conditions.

In particular, it is an object of the invention to provide a slide member with a solid lubrication coating film which can provide not only a good friction property but also excellent wear resistance under the fluid lubrication, boundary lubrication and dry lubrication conditions.

DISCLOSURE OF THE INVENTION

The present inventors have found that above object of the invention can be attained by providing a slide member having a solid lubrication coating film on a flat-plate-shaped base member, in which a plurality of grooves each having a specific shape are formed in the sliding surface of the slide member to thereby enhance the initial running-in property of the sliding surface and lower the quantity of heat generated due to the sliding motion of the slide member, so as to improve the friction characteristic of the sliding surface under the fluid lubrication condition. That is, in attaining the above object, according to the invention, there is provided a slide member having a solid lubrication coating film on a flat-plate-shaped base member, in which, in the sliding surface of the slide member, there are formed a plurality of grooves concentric with one another and extending in the peripheral direction of the sliding surface, and there are formed ridge portions respectively between the mutually adjoining ones of the grooves.

Specifically, in the sliding surface of a slide member having a solid lubrication coating film, there are formed a plurality of concentric grooves in the peripheral direction of the sliding surface in such a manner that the mutually adjoining ones of the grooves can form ridge portions between them; and, therefore, the delicate sliding contact of a mating slide member (for example, a bearing) can be secured quickly due to the wear and deformation of the ridge portions of the grooves, which makes it possible to enhance the initial running-in property of the sliding surface greatly. Accordingly, preferably, the ridge portions may be respectively formed in an angular shape.

On the other hand, lubricating oil flowing to the mating slide member can be secured in large quantity in the root portions of the grooves, so that an increase in the temperature due to the sliding motion of the two slide members can be prevented. Also, in an operation state where the lubricating oil can run short, since the lubricating oil can be kept in the root portions, metal contact between the two slide members can be prevented effectively.

By the way, in case where the above-mentioned root portions are holes or bores, they have a mechanism to be able to hold the lubricating oil; however, in this case, there is caused a turbulent flow in the lubricating oil, which impairs the fluid lubrication and, especially, under the high-speed operation condition, lowers the seizure resistance of the sliding surface. Also, it is necessary to form ridge portions which can be used to provide the above-mentioned initial running-in property. For these reasons, that is, the root portions must have a certain length, that is, it is necessary to employ a groove structure.

The depth of each of the peripheral-direction grooves, preferably, may be set in the range of 1 to 20 μm and the pitch of each groove, preferably, may be set in the range of 0.05 to 1 mm.

A slide member according to the invention, preferably, may include an intermediate layer between a base member and a solid lubrication coating film. And, the solid lubrication coating film, preferably, may contain poly-4-ethylene fluoride and/or graphite.

Figure 1:
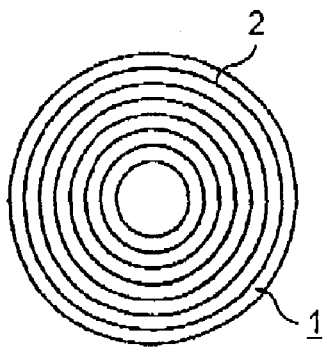
FIGS. 1a through 1c are plan views of an embodiment of a slide member according to the invention.
Figure 1:
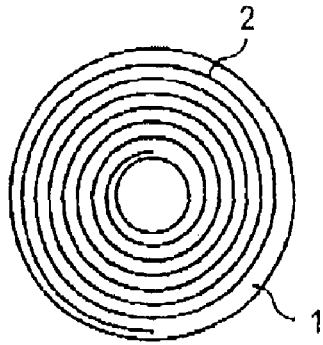
Figure 1:
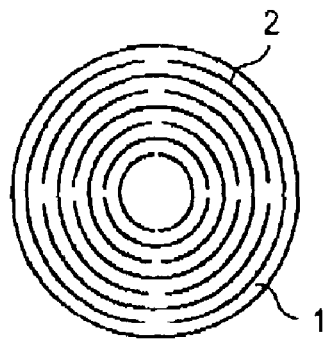

By the way, referring to the reference characters shown in the drawings, 1 designates a solid lubrication coating film (a sliding contact layer), 2 a peripheral groove, 3 a ridge portion, 4 a root portion, 6 an intermediate layer, 8 a base member, and 10 a slide member, respectively.

BEST MODE FOR CARRYING OUT THE INVENTION

Now, description will be given below in more detail of the invention.

In the invention, the grooves to be formed in the sliding surface of the slide member are not limited to any specific arrangements, provided that they can secure the above-mentioned structure. That is, the plurality of grooves, which are concentric with one another and extend in the peripheral direction of the sliding surface, (which are hereinafter referred to as peripheral grooves), as shown in FIG. 1 which is a plan view of the slide member, may be concentric-circle-shaped grooves (1a) or spiral-shaped grooves (1b). Also, the grooves may not always be continuous with one another; that is, they may be continuous (1a or 1b) or they may be discontinuous (for example, 1c). Further, referring to the peripheral direction, it may not be always the peripheral direction of a circular shape but it may be the peripheral direction of an elliptical shape; that is, the peripheral direction can be set properly according to the shape of a base member to be used. The direction of the peripheral grooves, preferably, maybe substantially the sliding direction of the slide member.

Figure 2:
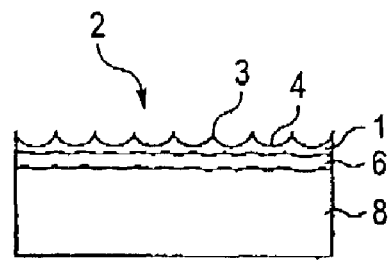
FIGS. 2a through 2c are section views of the embodiment of a slide member according to the invention; and, FIG. 3 is graphical representations of the results obtained by a test conducted on the embodiment.
Figure 2:
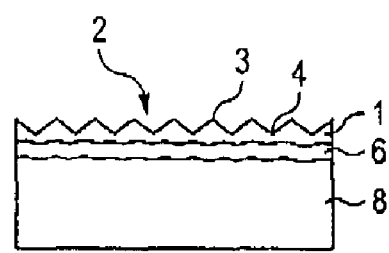
Figure 2:
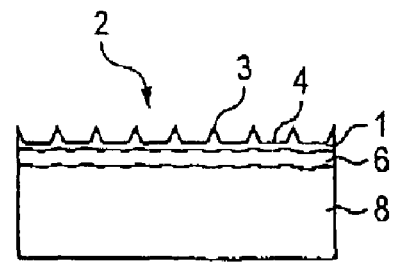

Also, as shown in FIG. 2 which is a section view of the slide member, the section shapes of the peripheral grooves, as described above, may be such that the mutually adjoining ones of the grooves respectively form the ridge portions between them; and, the shapes of the root portions of the grooves are not limited to specific ones, provided that they are able to secure the lubricating oil. For example, there can be used a semicircular shape (2a), a triangular shape (2b), and a trapezoidal shape (2c). However, the semicircular shape and triangular shape are preferred, because, in the case of these shapes, the rate of formation of the ridge portions is high and thus the contact surface pressure in the early stage is high, so that the root portions can be easily worn and deformed to thereby be able to attain a good proper initial running-in property. Especially, the semicircular shape is preferred because it is able to secure the lubricating oil in a large quantity.

The depth and pitch of each of the peripheral grooves are not limited to specific ones but they can be properly set according to the shape and size of a base member and according to the required sliding property of the slide member. The depth of each of the peripheral grooves, normally, may be in the range of 1 to 20 μm and, preferably, in the range of 1 to 7 μm. The pitch of each peripheral groove, normally, may be in the range of 0.05 to 1 mm and, preferably, in the range of 0.1 to 0.5 m. Also, in the sliding surface, the depths and/or pitches of the peripheral grooves may not all be uniform but, according to the peripheral speed differences or according to differences in the sliding properties, the depths and/or pitches may be varied properly on the sliding surface.

A method for forming the peripheral grooves of the invention on the sliding surface is not limited to a specific one. For example, there can be employed a method in which a slide member with a solid lubrication coating film as a sliding contact layer is cut worked at a given speed on a lathe using a chip having a given shape, or a method for transferring a groove shape using a press or a roller. Or, peripheral grooves may be formed on a base member or an intermediate layer disposed on a base member, a solid lubrication coating film may be applied on the peripheral grooves, with the result that the peripheral grooves can be formed on the sliding surface of the slide member.

The flat-plate-shaped base member used in the slide member is not limited to a specific member but there can be used various base members which are conventionally known in the field of slide members. Specifically, there can be used an iron-system or aluminum-system member, a composite member made of aluminum members fixed and connected together, a metal member made of iron-system metal such as steel or stainless steel, a metal member made of copper-system metal such as a copper alloy, a metal member made of aluminum-system metal such as an aluminum alloy, or a member made of resin. As the aluminum-system material, preferably, there may be used A390 in which pro-eutectic Si is precipitated. In the case of the base member including the intermediate layer, in order to enhance the close contact property of the sliding contact layer as well as the heat radiation property and wear resistance of the intermediate and sliding contact layers, preferably, the surface thereof may be roughened. The roughness of the surface, preferably, may be set in the range of 0.4 to 25 μmRz and, more preferably, in the range of 0.6 to 20 μmRz. That is, in case where the surface roughness is set within this range, the above object can be attained effectively.

As the method for forming the roughened surface in the base member, there can be employed a shot blasting method or an etching method.

Next, description will be given below of a solid lubrication coating film (a sliding contact layer) according to the invention.

The solid lubrication coating film of the invention is a film which contains solid lubricant and normally contains thermosetting resin as a binder. The solid lubricant, which can be used in the invention, is not limited to any specific one but there are available molybdenum disulfide ($MoS_2$), graphite, h-BN, tungsten disulfide ($WS_2$), poly-4-ethylene fluoride (which is hereinafter referred to as PTFE), fluorine-system resin, Pb, and Cf. The present solid lubricant can reduce and stabilize the coefficient of friction as well as can prevent occurrence of seizure. In order to be able to perform these functions sufficiently, the average diameter of the grains of the solid lubricant, preferably, may be 15 μm or less and, more preferably, may be in the range of 0.2 to 10 μm.

A solid lubrication coating film (which is also hereinafter referred to as a film simply) according to the invention, most preferably, may contain at least one of PTFE and graphite. In this case, there can be obtained not only more stable low friction property but also excellent wear resistance. As PTFE, especially, it is preferred to use granulated burned poly-4-ethylene fluoride.

Here, the above-mentioned burned PTFE means one that can be produced when PTFE powder obtained by suspension polymerization or by emulsion polymerization is raised in temperature (is burned) up to its melting point and is then granulated. The burned PTFE also includes one which, before burned, is compression molded and, after burned, is granulated. Especially, it is preferred to use PTFE which can be produced when PTFE powder obtained by suspension polymerization is molded once and is then burned and granulated. The powder obtained by suspension polymerization is used as molding powder, while the powder obtained by emulsion polymerization is used as fine powder. Due to use of such burned powder, as PTFE, there can be obtained relatively hard one, which can provide not only an excellent low friction property but also excellent wear resistance.

The above-mentioned burned PTFE is granular. Although the average grain diameter thereof is not limitative, use of PTFE having an average grain diameter of 7 $\mu$m or more can provide more excellent low friction property and more excellent wear resistance. On the other hand, in case where PTFE having an average grain diameter of less than 7 $\mu$m is used, PTFE is dispersed finely in the binder and thus the friction property of the binder can be preferably enhanced. Most preferably, 0.5 to 10 mass % of PTFE having an average grain diameter of 7 $\mu$m or more and 2 to 30 mass % of PTFE having an average grain diameter of less than 7 $\mu$m may be combined together.

Graphite may preferably have a high degree of crystallization. More preferably, graphite may have an inter-surface clearance of 3.5 or less and, in this case, graphite can provide an effect that it can stabilize the friction torque thereof during the sliding motion of the slide member. Here, the term "to stabilize the friction torque" means to reduce variations in the friction coefficient. Graphite may be natural graphite or artificial graphite. However, preferably, artificial graphite may be used from the viewpoint of wear resistance.

Although the average grain diameter of graphite is not limitative, use of graphite having an average grain diameter of 10 $\mu$m or more can further enhance the wear resistance thereof when it receives a load. On the other hand, in case where graphite having an average grain diameter of less than 10 $\mu$m is used, graphite is finely dispersed in the binder, which preferably can enhance the wear property of the binder and also can stabilize the friction toque. Therefore, preferably, 0.5 to 5 mass % of graphite having an average grain diameter of 10 $\mu$m or more and 13 to 35 mass % of graphite having an average grain diameter of less than 10 $\mu$m may be combined together.

The content of PTFE contained in the film material, preferably, may be 10 to 40 mass % and, more preferably, 22 to 35 mass %; and, the graphite content of the film material, preferably, may be 3 to 40 mass % and, more preferably, 5 to 30 mass %. However, the total content of PFTE and graphite, preferably, maybe 70 mass % or less in the coating film material. In case where the PTFE content is less than 10 mass %, lubrication on the sliding surface is insufficient and thus the friction coefficient increases; and, on the other hand, in case where the PTFE content is more than 40 mass %, the material strength is lowered and thus the wear resistance is reduced. Also, in case where the graphite content is less than 3 mass %, the load capacity is lowered and thus the wear resistance is reduced; and, on the other hand, in case where the graphite content is more than 40 mass %, lubrication on the sliding surface is insufficient and thus the friction coefficient increases.

Further, when two kinds of PTFE differing in the average grain diameter are used in combination, PTFE having an average grain diameter of 7 $\mu$m or more may be contained by 0.5 to 10 mass %, more preferably, by 2 to 7 mass % and PTFE having an average grain diameter of less than 7 $\mu$m may be contained by 2 to 30 mass %, more preferably, by 5 to 25 mass %. In case where the content of PTFE having an average grain diameter of 7 $\mu$m or more is less than 0.5 mass %, unfavorably, lubrication on the sliding surface is insufficient and thus the friction coefficient increases; and, on the other hand, in case where the content of this PTFE exceeds 10 mass %, similarly unfavorably, the film coated surface is roughened and thus the friction coefficient increases. Also, in case where the content of PTFE having an average grain diameter of less than 7 $\mu$m is less than 2 mass %, unfavorably, the film coated surface is roughened and thus the friction coefficient increases; and, on the other hand, in case where the content of PTFE having an average grain diameter of less than 7 $\mu$m is more than 30 mass %, unfavorably, the material strength is weakened and thus the wear resistance is lowered.

And, when two kinds of graphite differing in the average grain diameter are used in combination, graphite having an average grain diameter of 10 $\mu$m or more may be contained by 0.5 to 5 mass %, more preferably, by 1 to 3 mass % and graphite having an average grain diameter of less than 10 $\mu$m may be contained by 13 to 35 mass %, more preferably, by 20 to 30 mass %. In case where the content of graphite having an average grain diameter of 10 $\mu$m or more is less than 0.5 mass %, unfavorably, the load capacity is lowered and thus the wear resistance is lowered; and, on the other hand, in case where the content of this graphite exceeds 5 mass %, similarly unfavorably, the film applied surface is roughened and thus the friction coefficient increases. Also, in case where the content of graphite having an average grain diameter of less than 10 $\mu$m is less than 13 mass %, unfavorably, lubrication on the sliding surface is insufficient and thus the friction coefficient increases; and, on the other hand, in case where the content of this graphite is more than 35 mass %, unfavorably, the material strength is weakened and thus the wear resistance is lowered.

As the resin binder that can be used in the film of the slide member according to the invention, for example, there are available polyimide resin (PI), polyamide-imide-system resin (PAI), epoxy resin, phenol resin, polyamide (nylon), fluoro-resin (PTFE, FEP), and elastomer. Preferably, there may be used aromatic polyimide, polyether imide, polyester imide or aromatic polyamideimide, and thermosetting resin such as varnish of diisocyanate denatured resin, varnish of BPDA denatured resin and varnish of sulfone denatured resin.

More specifically, the above-mentioned resin binder can be selectively used according to using conditions. For example, in case where heat resistance is necessary, preferably, there may be used PAI and PI; in case where low-temperature burning and low cost are required, preferably, there may be used epoxy resin and phenol resin; when a minute movement is required, there maybe used elastomer; and, when low friction is necessary, there may be used fluorocarbon resin.

The above-mentioned film may preferably contain the resin binder by 30 to 80 mass %. Use of this content can maintain the holdability of the solid lubricant and abrasives in the coating film containing thermosetting resin, can obtain sufficient seizure resistance and running-in property, and allows the acute-angle-shaped hard powder to fulfill its grinding function effectively.

Especially, when PTFE and graphite are used in combination, as the resin binder thereof, preferably, PI and/or PAI may be contained by 30 to 77 mass %. Use of this content can maintain the holdability of the solid lubricant and abrasives in the coating film containing thermosetting resin, can obtain sufficient seizure resistance and running-in property, and allows the above-mentioned PTFE and graphite to fulfill the above-mentioned functions thereof effectively.

A film material according to the invention, in addition to the above-mentioned materials, can further contain an extreme pressure agent. As the extreme pressure agent that can be used in the invention, there are available sulfur containing metal compounds such as Zns, $Ag_2S$, CuS, FeS, $FeS_2$, $Sb_3S_2$, PbS, $Bi_2S_3$, CdS; sulfur containing compounds such as thiram, morpholine disulfide, dithionate, sulfide, sulfoxide, sulfonic acid, thiophosphonate, thiocarbonate, dithiocarbonate, alkylthiocarbamoyl, olefin sulfide; halogen-system compounds such as chlorinated hydrocarbon; organic-metal-system compounds such as thiophosphate (dithiophosphate), and thiocalbamate; and, organic molybdenum compounds such as molybdenum dithiophosphate and molybdenum dithiocarbamate. Addition of these extreme pressure agents can provide an excellent sliding performance even in oil, or under the mixed lubrication condition, or under the boundary lubrication condition.

According to the invention, in preparing the solid lubrication film composition, there can be used a proper amount of organic solvent (diluent). The organic solvent can adjust the viscosity of the film composition to thereby facilitate the mixture thereof; and, it can be used with no special limit, provided that it is able to solve polyamideimide resin. For example, in case where resin is polyamideimide, there can be used xylene, N-methyl-2-pyrrolidone, and toluene.

In the present invention, preferably, between the base member and solid lubrication film (sliding contact layer), there may be interposed an intermediate layer. The intermediate layer is interposed between the base member and sliding contact layer and can be used to keep the sliding performance of the slide member in a good level even in case where the sliding contact layer is worn. As the material that can provide a good sliding property, there are available electrolytic or no-electrolytic Sn plating, electrolytic Sn alloy plating, electrolytic or no-electrolytic Cu plating, electrolytic copper alloy (a copper alloy to which there is added an element such as Pb, Sn, In, or Ag capable of improving the sliding performance) plating, thermally-sprayed copper alloy, clad copper (alloy), and sintered copper (alloy); that is, preferably, the intermediate layers may be composed of the above materials.

Especially, in case where the invention is applied to a swash plate, when the thermosetting resin attached on these intermediate layers flows together with the solid lubricant and is transferred from the low-load area of the swash plate to the high-load area thereof by a shoe, the resin and other materials are pressure attached to their transferred area where the film has been worn in part or completely. In case where a base member made of iron-system material is used as the base member of the intermediate layers, there can be used a Ni-plated layer which can improve the close adhesion property of the intermediate layers. Further, in the case of a base member made of an aluminum alloy, a chlomate treatment can be enforced on the intermediate layers.

In the present invention, from the viewpoint of wear resistance, as the intermediate layer, preferably, there may be used a copper-aluminum composite thermally-sprayed layer. Especially, it is preferred to use a copper-aluminum composite thermally-sprayed layer disclosed in JP-A-2001-20054 in which copper or a copper alloy (which is hereinafter referred to as a copper alloy simply) contains at least an undissolved phase and aluminum or an aluminum alloy (which is hereinafter referred to as an aluminum alloy simply) contains at least a dissolved phase. Here, the term "dissolved phase" means a system which is dissolved during the thermal spray treatment of the above-mentioned composite material, that is, a state in which the material is dissolved and solidified during the thermal spray treatment. Specifically, according to the general tendency of the thermal spray treatment, when copper alloy powder and aluminum alloy powder are equal in the average grain diameter, the aluminum alloy powder is dissolved; and, when the average grain diameter of the aluminum alloy powder is much larger than that of the copper alloy powder, the latter is also dissolved. That is, by making use of this tendency, there can be manufactured a copper-aluminum composite material in which at least part of the aluminum alloy powder thereof is dissolved and the remaining portions of the aluminum alloy powder substantially maintain the property of solid powder. The thus-manufactured copper-aluminum composite material is more excellent in the pure aluminum wear resistance than copper (alloy) and, further, many of aluminum alloys, in the cast states thereof, are excellent in the wear resistance. Therefore, in case where the aluminum alloy is not completely alloyed with the copper alloy but is just combined or composited with the copper alloy, the wear resistance of the whole of the composite material can be enhanced over the copper (alloy). When these are taken into account, in the case of the rate of the copper alloy and aluminum alloy, preferably, the former may be 80 to 30% by weight and the latter may be the remaining percentage (that is, 20 to 70%) by weight.

Now, description will be given below of a method for manufacturing a slide member according to the invention.

After a base member made of copper, stainless steel, copper alloy, aluminum alloy or resin is worked into a given shape, the base member is degreased in an alkaline treatment solution such as caustic soda and is then rinsed by water or by warm water to thereby remove alkali attached to the surface of the base material. For example, when it is necessary to enhance the close contact of a solid solution film, after end of degreasing, the surface of a lining may be roughened by a chemical treatment consisting of alkaline etching and acid cleaning, or the lining surface may be roughened by a mechanical treatment such as shot blasting, or the lining surface may be poled to form uneven portions on the lining surface. And, when it is necessary to further enhance the close contact of a solid solution film, a chemical treatment may be enforced on the lining surface by using a layer of zinc phosphate or zinc calcium phosphate having a thickness of 0.1 to 5 μm. In case where the base treatment such as poling and chemical treatment are combined, there can be obtained a lubrication film layer which has a very high degree of close contact property.

Also, as the need arises, as described above, there can be formed an intermediate layer by a thermal spray method As the thermal spray method, there can be employed various thermal spray methods which are disclosed in the above-mentioned "toraibolojisuto", Page 20, FIG. 2; and, preferably, there may be used a high velocity oxy fuel spray method (HVOF). The thickness of the thermal spray layer (intermediate layer), preferably, may be in the range of 10 to 500 μm.

The solid solution film composition, which has been dried after degreasing and diluted using a proper diluent, is applied onto a lining by spraying and is then dried and burned at the temperature of 150 to 300° C. In case where the surface roughness of the film after it is formed is rough, the film surface may be smoothened by buffing. The solid solution film can be formed according to not only a spray coating method (for example, an air spray method, and an air electrostatic coating method) but also a tumbling method, a dipping method, a brushing method, a roll-type printing method (for example, a screen printing method, a pad printing method), and a bell-type rotation-atomization-type electrostatic coating method. The thickness of the solid lubrication film, preferably, may be in the range of 1 to 50 μm.

After the solid lubrication film is formed in the above-mentioned manner, the solid lubrication film is cut worked at a given feed speed on a lathe using a chip having a given shape, or a groove shape is transferred to the surface of the solid lubrication film using a press or a roller. In this manner, a slide member according to the invention can be obtained.

A slide member according to the invention can be applied to a swash plate for a compressor, a thrust washer, and a crank washer.

EMBODIMENTS

Next, the invention will be demonstrated using an embodiment of the invention. However, the invention is not limited to the following embodiment.

EMBODIMENT 1

By thermally spraying a thermal spray material consisting of Cu 44.0%, Sn 2.0%, Pb 9.0%, Al 25.0% and Si 20.0% onto a base member for a swash plate made of iron-system material, there is formed an intermediate layer. After then, as a solid solution film composition, there was prepared raw material in such a manner that it consists of polyamideimide resin 50 mass %, PTFE (average grain diameter 5 μm) 24 mass %, and graphite (average grain diameter 1 μm) 20 mass %. N-methyl-2-pyrrolidone, as the solvent of the resin, was added to the raw material and they were all mixed together, the mixture was applied by spray coating onto the base member with the intermediate layer formed thereon, thereby forming a solid lubrication coating film having a thickness of 40 μm. After then, the solid lubrication coating film was burned at the temperature of 190° C. for an hour and, next, the thus-burned solid lubrication coating film was groove worked at the feed speed of 0.16 mm on a lathe using a diamond chip of 0.8 R (curvature), thereby forming such a peripheral groove as shown in FIGS. 1a and 2a which has a depth of 4 μm and a pitch of 0.16 mm.

After then, a peeling test and a friction test were conducted on the swash plate, in which the peripheral groove is formed on the solid lubrication coating film in the above-mentioned manner, under the following conditions. On the other hand, a swash plate for comparison was formed entirely in the same manner to the swash plate according to the embodiment 1, except that a peripheral groove was not formed. And, the same peeling and friction test were similarly conducted on the swash plate for comparison.

Test type: 3 shoes/flat plate
Number of rotations: 2000 rpm (6.3 m/s)
Load: 3000 N (10 MPa)
Lubrication: Mist lubrication
Kind of oil: Refrigerating machine oil
Amount of oil: 1.8 g/min
Time: 1 hour.

Figure 3:
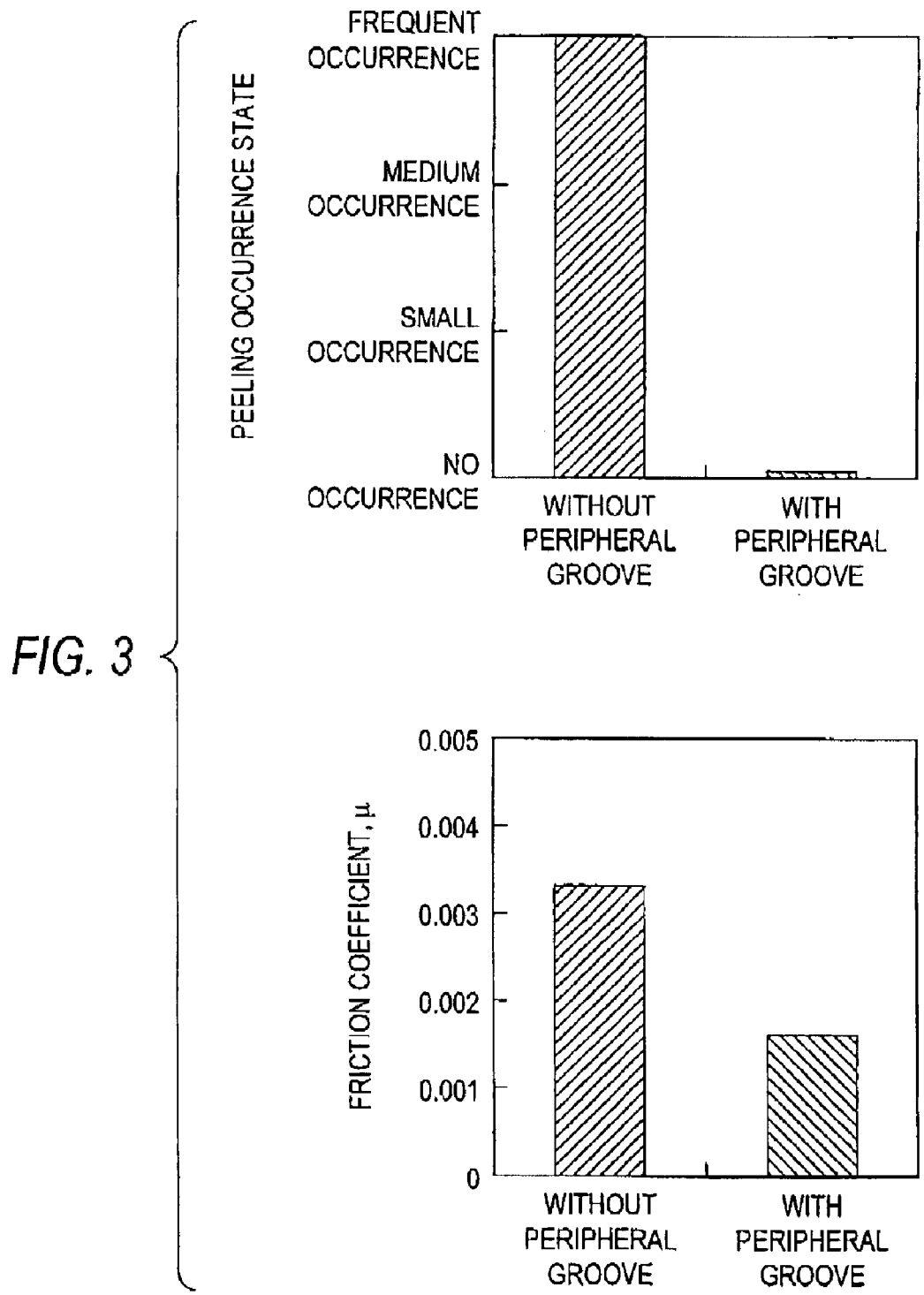

The results of the tests are shown in FIG. 3 (here, a peeling occurrence state means the number of peeled portions occurred in one swash plate).

The test results show that, due to provision of a peripheral groove according to the invention, there can be obtained a slide member which is enhanced in the initial running-in property, is good in the friction characteristic and is excellent in the wear resistance.

While the invention has been described heretofore in detail and with reference to a specific embodiment thereof, it will be obvious to those skilled in the art that various changes and modifications are possible without departing from the spirit and scope of the invention.

The present application is based on the Japanese patent application (Patent Application 2001-076230) filed on Mar. 16, 2001 and thus the contents thereof are cited into the present application for reference.

INDUSTRIAL APPLICABILITY

A slide member with a solid lubrication coating film according to the invention is enhanced in the initial running-in property and thus can provide an excellent sliding property even under the strict sliding conditions. Especially, a slide member according to the invention can provide a good friction property under the fluid lubrication, boundary lubrication and dry lubrication conditions as well as is excellent in the wear resistance.

What is claimed is:

1. A slide member including a solid lubrication coating film on a flat-plate-shaped base member, wherein, in the surface of said slide member, there are formed a plurality of concentrical grooves extending in the peripheral direction of said slide member surface, and, between the mutually adjoining ones of said grooves, there are formed ridge portions respectively.

2. The slide member as set forth in claim 1, wherein said slide member is a swash plate for a compressor.

3. The slide member as set forth in claim 1, wherein said solid lubrication coating film includes poly-4-ethylene fluoride.

4. The slide member as set forth in claim 1, wherein the plurality of concentrical grooves are continuous.

5. The slide member as set forth in claim 1, wherein the plurality of concentrical grooves are discontinuous.

6. The slide member as set forth in claim 1, wherein the solid lubrication defines the grooves with the ridge portions and valleys between the ridge portions.

7. The slide member as set forth in claim 6, wherein the grooves are formed by cut working.

8. The slide member as set forth in claim 1, wherein the depth of each of said grooves is set in the range of 1 to 20 μm and the pitch of each of said grooves is set in the range of 0.05 to 1 mm.

9. The slide member as set forth in claim 8, wherein said slide member is a swash plate for a compressor.

10. The slide member as set forth in claim 1, wherein said solid lubrication coating film includes at least one of poly-4-ethylene fluoride and graphite.

11. The slide member as set forth in claim 10, wherein said slide member is a swash plate for a compressor.

12. The slide member as set forth in claim 10, wherein the depth of each of said grooves is set in the range of 1 to 20 μm and the pitch of each of said grooves is set in the range of 0.05 to 1 mm.

13. The slide member as set forth in claim 12, wherein said slide member is a swash plate for a compressor.

14. The slide member as set forth in claim 1, further including an intermediate layer formed between said base member and said solid lubrication coating film.

15. The slide member as set forth in claim 14, wherein said slide member is a swash plate for a compressor.

16. The slide member as set forth in claim 14, wherein said solid lubrication coating film includes poly-4-ethylene fluoride.

17. The slide member as set forth in claim 14, wherein the depth of each of said grooves is set in the range of 1 to 20 μm and the pitch of each of said grooves is set in the range of 0.05 to 1 mm.

18. The slide member as set forth in claim 17, wherein said slide member is a swash plate for a compressor.

19. The slide member as set forth in claim 14, wherein said solid lubrication coating film includes at least one of poly-4-ethylene fluoride and graphite.

20. The slide member as set forth in claim 19, wherein said slide member is a swash plate for a compressor.

21. The slide member as set forth in claim 19, wherein the depth of each of said grooves is set in the range of 1 to 20 μm and the pitch of each of said grooves is set in the range of 0.05 to 1 mm.

22. The slide member as set forth in claim 21, wherein said slide member is a swash plate for a compressor.

23. A slide member including a solid lubrication coating film on a flat-plate-shaped base member, wherein, in the surface of said slide member, there are formed grooves forming a spiral and extending in the peripheral direction of said slide member surface, and, between the mutually adjoining ones of said grooves, there are formed ridge portions respectively.

24. The slide member as set forth in claim 23, wherein the grooves form a spiral about a common center.

25. The slide member as set forth in claim 23, wherein the solid lubrication defines the grooves with the ridge portions and valleys between the ridge portions.

26. The slide member as set forth in claim 25, wherein the grooves are formed by cut working.

* * * * *